US011059205B2

United States Patent
Ho et al.

(10) Patent No.: US 11,059,205 B2
(45) Date of Patent: Jul. 13, 2021

(54) METHOD FOR FABRICATING NANOPOROUS POLYMER THIN FILM AND CORRESPONDING METHOD FOR FABRICATING NANOPOROUS THIN FILM

(71) Applicant: NATIONAL TSING HUA UNIVERSITY, Hsinchu (TW)

(72) Inventors: Rong-Ming Ho, Hsinchu (TW); Mohan Raj Krishnan, Hsinchu (TW); Suhail Kizhakkeveettil Siddique, Hsinchu (TW); Yu-Cheng Chien, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 384 days.

(21) Appl. No.: 16/104,190

(22) Filed: Aug. 17, 2018

(65) Prior Publication Data

US 2019/0255745 A1  Aug. 22, 2019

(30) Foreign Application Priority Data

Feb. 21, 2018 (TW) ................ 107105826

(51) Int. Cl.
*B29C 41/46* (2006.01)
*B29C 41/00* (2006.01)
(Continued)

(52) U.S. Cl.
CPC .......... *B29C 41/46* (2013.01); *B29C 37/0025* (2013.01); *B29C 41/003* (2013.01);
(Continued)

(58) Field of Classification Search
CPC ........................................ C08J 7/02
See application file for complete search history.

(56) References Cited

U.S. PATENT DOCUMENTS 3,839,516 A * 10/1974 Williams et al. ..... B29C 55/005
264/41
3,860,680 A * 1/1975 Warwicker .............. B29C 67/20
264/41
(Continued)

FOREIGN PATENT DOCUMENTS

TW          201520058 A     6/2015

OTHER PUBLICATIONS

Krishnan et al, Fabrication of Mesoporous Polystyrene Films with Controlled Porosity and Pore Size by Solvent Annealing for Templated Syntheses, Aug. 17, 2017, American Chemical Society, Langmuir, 33, 8428-8435 (Year: 2017).*

(Continued)

*Primary Examiner* — Timothy Kennedy
(74) *Attorney, Agent, or Firm* — McClure, Qualey & Rodack, LLP (57) ABSTRACT

A method for fabricating nanoporous polymer thin film includes steps as follows. A polymer thin film is provided, wherein a polymer solution including a polymer is coated on a substrate to form the polymer thin film. A swelling and annealing process is provided, wherein the polymer thin film is disposed inside a chamber with a vapor of a first solvent, the polymer thin film is swollen and annealed to form a swollen polymer thin film, and the swollen polymer thin film includes the polymer and the first solvent. A freezing process is provided, wherein the swollen polymer thin film is cooled to a temperature less than or equal to a crystallization temperature of the first solvent to crystallize the first solvent. A first solvent removing process is provided, wherein the first solvent is removed with a second solvent, such that a nanoporous polymer thin film is obtained.

10 Claims, 11 Drawing Sheets

(51) Int. Cl.
    *B29C 37/00* (2006.01)
    *C23C 18/16* (2006.01)
    *C23C 18/32* (2006.01)
    *C09D 125/06* (2006.01)
    *C08J 7/02* (2006.01)
    *H01G 9/20* (2006.01)
    *G02B 1/11* (2015.01)
    *B29K 25/00* (2006.01)
    *B29L 7/00* (2006.01)

(52) U.S. Cl.
    CPC .............. *C08J 7/02* (2013.01); *C09D 125/06* (2013.01); *C23C 18/1641* (2013.01); *C23C 18/1644* (2013.01); *C23C 18/32* (2013.01); *B29K 2025/06* (2013.01); *B29L 2007/008* (2013.01); *C08J 2325/06* (2013.01); *G02B 1/11* (2013.01); *H01G 9/2031* (2013.01)

(56) References Cited

U.S. PATENT DOCUMENTS 4,230,463 A * 10/1980 Henis ..................... B01D 53/22
                                                      210/500.23
2003/0015826 A1* 1/2003 Topolkaraev ........... C08L 67/04
                                                       264/444

OTHER PUBLICATIONS

Zhongcheng Pan et al., "Morphologies in Acetone-Annealed Polystyrene-Poly(methylmethacrylate) Diblock Copolymer Thin Films", Acta Chimica Sinica , published in 2012, vol. 70, No. 12, abstract, p. 1372 left column line No. 29-40 and p. 1372 right column line No. 5-19, jointly published by Shanghai Institute of Organic Chemistry, Chinese Academy of Sciences and Chinese Chemical Society, China.

Colm T. O'Mahony et al., "Microphase Separation of a PS-b-PFS Block Copolymer via Solvent Annealing: Effect of Solvent, Substrate, and Exposure Time on Morphology", International Journal of Polymer Science, published in 2015, vol. 2015, Article ID 270891, pp. 1-10, published by Hindawi Publishing Corporation, Egypt.

* cited by examiner

METHOD FOR FABRICATING NANOPOROUS POLYMER THIN FILM AND CORRESPONDING METHOD FOR FABRICATING NANOPOROUS THIN FILM

RELATED APPLICATIONS

This application claims priority to Taiwan Application Serial Number 107105826, filed Feb. 21, 2018, which is herein incorporated by reference.

BACKGROUND

Technical Field

The present disclosure relates to a thin film fabricating method. More particularly, the present disclosure relates to a method for fabricating nanoporous polymer thin film and a corresponding method for fabricating nanoporous thin film.

Description of Related Art

Nanoporous materials are widely used in many fields, such as the optical filed, the biology field and medical field, due to the superior performance thereof. A conventional nanoporous material can be fabricated by an inverted method and a phase separation method, etc. However, such methods have disadvantages of complication and long process time.

Therefore, how to develop a method for fabricating a nanoporous thin film having cost-effective and short process time becomes a pursuit target for practitioners.

SUMMARY

The present disclosure provides a method for fabricating nanoporous polymer thin film including steps as follows. A polymer thin film is provided, wherein a polymer solution including a polymer coated on a substrate to form the polymer thin film. A swelling and annealing process is provided, wherein the polymer thin film is kept inside a chamber with a vapor of a first solvent, and the polymer thin film is swollen and annealed to form a swollen polymer thin film including the polymer and the first solvent. A freezing process is provided, wherein the swollen polymer thin film is cooled to a temperature less than or equal to a crystallization temperature of the first solvent to crystallize the first solvent. A first solvent removing process is provided, wherein the first solvent is removed with a second solvent such that a nanoporous polymer thin film is obtained.

The present disclosure provides corresponding method for fabricating nanoporous thin film including steps of providing a template, providing a filling process and providing a template removing process. The template includes a nanoporous polymer thin film fabricated by the above-mentioned method. In the filling process, a mixture film is fabricated. The mixture film includes a first material and the nanoporous polymer thin film, and the first material is filled in a plurality of pores of the nanoporous polymer thin film. In the template removing process, the nanoporous polymer thin film is removed to form a nanoporous thin film composed of the first material.

BRIEF DESCRIPTION OF THE DRAWINGS

The disclosure can be more fully understood by reading the following detailed description of the embodiments, with reference made to the accompanying drawings as follows.

DETAILED DESCRIPTION

Method for Fabricating Nanoporous Polymer Thin Film

Figure 1:
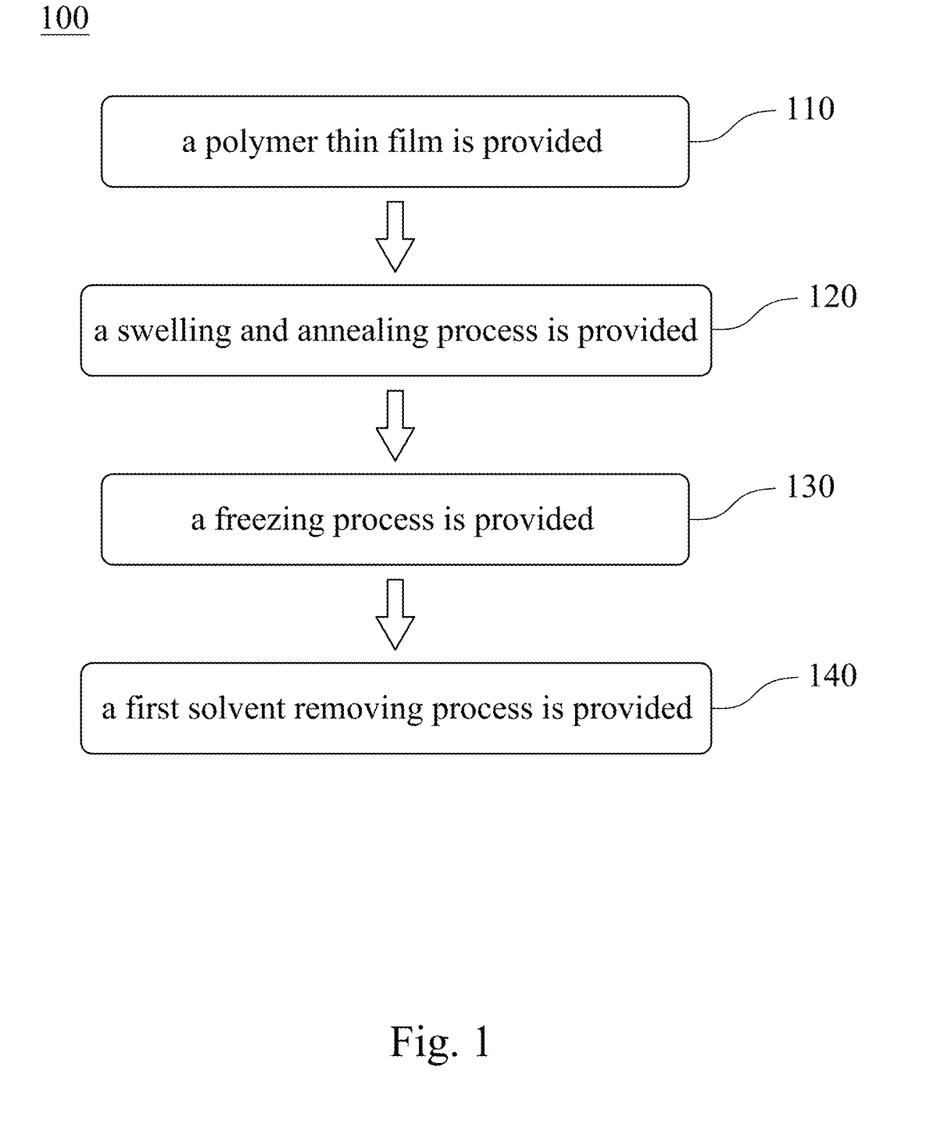
FIG. 1 shows a flow chart of a method for fabricating nanoporous polymer thin film according to one embodiment of the present disclosure.
Figure 2:
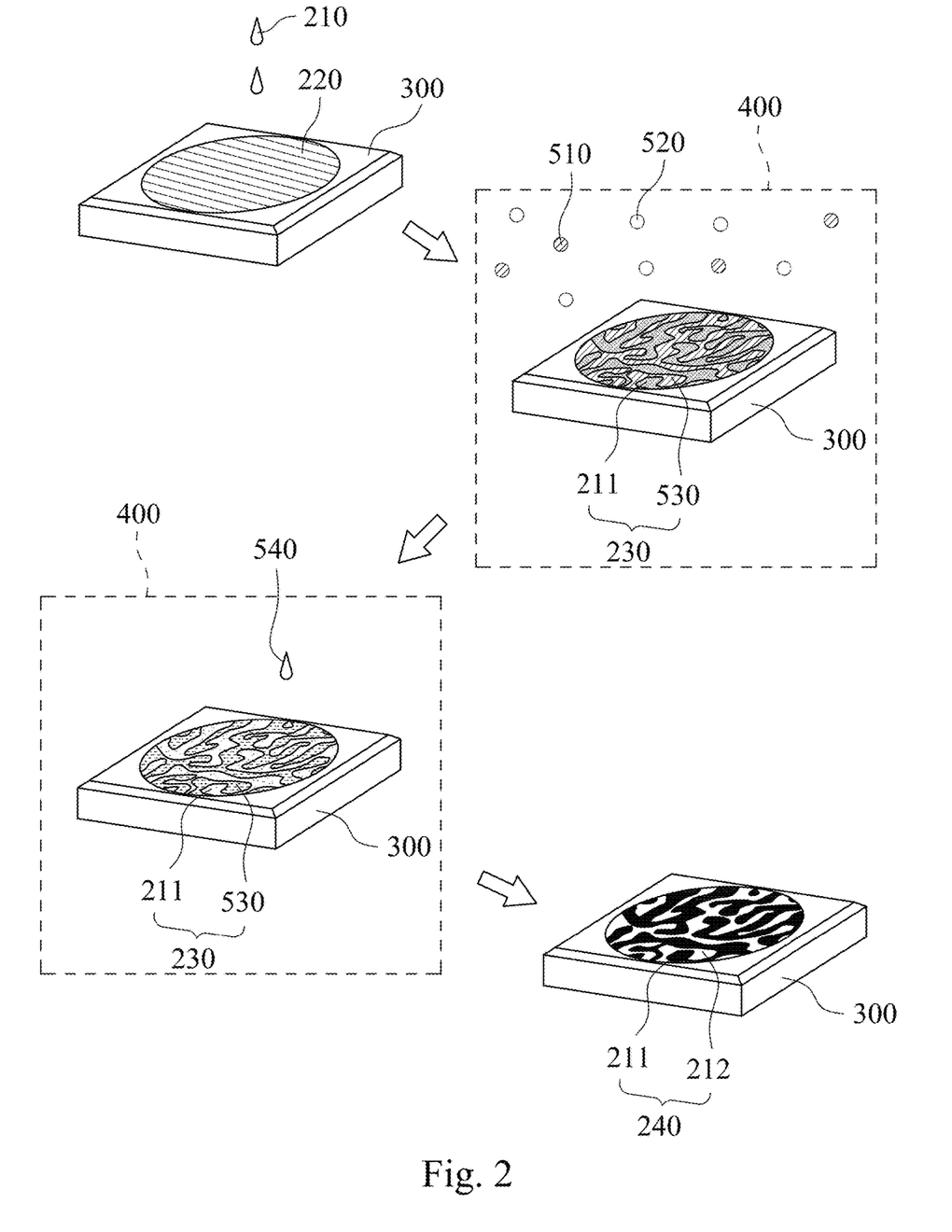
FIG. 2 shows a schematic illustration of the method of FIG. 1.
Figure 3:
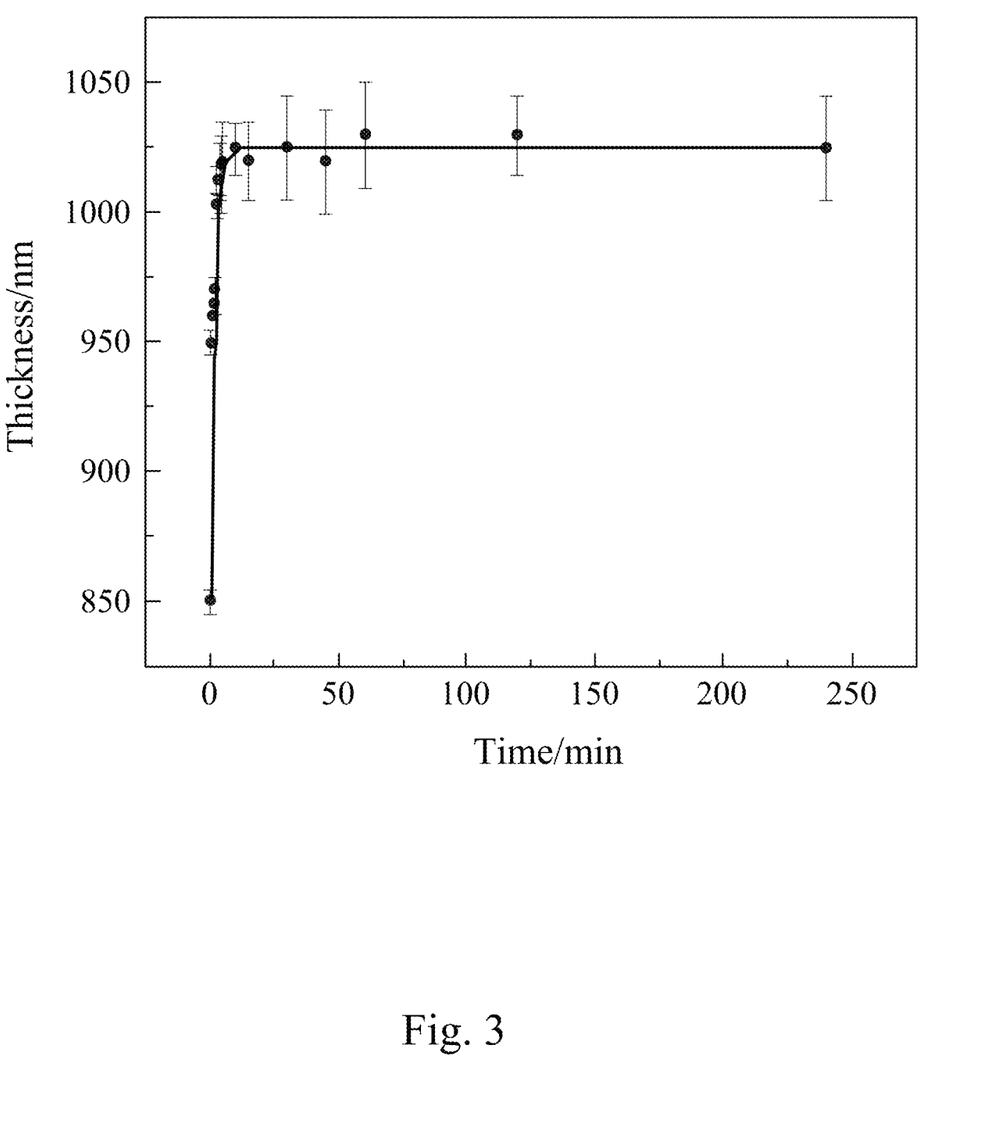
FIG. 3 shows a relationship between thickness and time of Step 120 of FIG. 1.

FIG. 1 shows a flow chart of a method 100 for fabricating nanoporous polymer thin film according to one embodiment of the present disclosure. FIG. 2 shows a schematic illustration of the method 100 of FIG. 1. FIG. 3 shows a relationship between thickness and time of Step 120 of FIG. 1. Refer to FIG. 1, FIG. 2 and FIG. 3, the method 100 for fabricating nanoporous polymer thin film includes Step 110, Step 120, Step 130 and Step 140.

In Step 110, a polymer thin film 220 is provided. A polymer solution 210 including a polymer 211 is coated on a substrate 300 to form the polymer thin film 220.

In Step 120, a swelling and annealing process is provided. The polymer thin film 220 is kept inside a chamber 400 with a vapor 510 of a first solvent 530, and the polymer thin film 220 is swollen and annealed to form a swollen polymer thin film 230 including the polymer 211 and the first solvent 530.

In Step 130, a freezing process is provided. The swollen polymer thin film 230 is cooled to a temperature less than or equal to a crystallization temperature of the first solvent 530 to crystallize the first solvent 530.

In Step 140, a first solvent removing process is provided. The first solvent 530 is removed with a second solvent such that a nanoporous polymer thin film 240 is obtained.

Therefore, the polymer thin film 220 is converted to the swollen polymer thin film 230 owing to the phase separation between the first solvent 530 and the polymer 211 occurred in the swelling and annealing process. Moreover, the nanoporous polymer thin film 240 can be fabricated through the freezing process and the first solvent removing process. The detail of the method 100 will be described below.

The polymer 211 included in the polymer thin film 220 can be polystyrene, and the substrate 300 can be a silicon wafer in the embodiment. The polymer solution 210 is fabricated by mixing polystyrene with neutral solvents such as chlorobenzene. The polymer solution 210 is spin-coated on the substrate 300 and then baked in a vacuum oven, such that the polymer thin film 220 including the polymer 211 is retained. In other embodiment not shown, the polymer 211 can be, but not limited to, poly(methyl-methacrylate), polysulfone or polycarbonate. Preferably, the polymer 211 can be amorphous polymers.

In the swelling and annealing process of Step 120, the vapor 510 of the first solvent 530 is taken in the chamber 400 first, and then the polymer thin film 220 is put into the chamber 400. In other word, the vapor 510 formed by the first solvent 530 under saturation pressure is included in the chamber 400, and the first solvent 530 can be crystallizable solvents such as N,N-dimethylformamide. As shown in FIG. 3, the polymer thin film 220 is swollen when contacting with the vapor 510, such that a thickness of the polymer thin film 220 is increased and remained at a certain value. After continuous vapor anneal, the polymer thin film 220 is converted to the swollen polymer thin film 230. The vapor anneal facilitates inducing phase separation at nanoscale between the polymer 211 and the first solvent 530 of the swollen polymer thin film 230. In other embodiment not shown, the first solvent 530 can be, but not limited to, dimethyl sulfoxide. Preferably, the first solvent 530 can be crystallizable solvent which is a liquid at room temperature and can be crystalized at low temperature.

In the freezing process of Step 130, a liquid nitrogen 540 can be introduced into the chamber 400 to quickly freeze the swollen polymer thin film 230. In other embodiment not shown, the swollen polymer thin film 230 can be frozen by any method which can freeze the swollen polymer thin film 230, and the present disclosure will not be limited thereto. When a temperature of the swollen polymer thin film 230 is lower than the crystallization temperature of the first solvent 530, the first solvent 530 will be crystallized and no reaction will occur. Hence, the phase separation between the polymer 211 and the first solvent 530 is remained.

In Step 140, methanol can be severed as the second solvent to remove the first solvent 530. The temperature of the swollen polymer thin film 230 will raise when the first solvent 530 is removed, which facilitates the removal of the first solvent 530. In other embodiment not shown, the second solvent can be ethanol or isopropyl alcohol. Preferably, the second solvent can be lower aliphatic alcohols.

Therefore, the swollen polymer thin film 230 can be converted to the nanoporous polymer thin film 240 after freezing and removal of the first solvent 530. The nanoporous polymer thin film 240 includes polymer 211 and a plurality of pores 212 which are net spaces left by removal of the first solvent 530.

In the method 100 for fabricating nanoporous polymer thin film, when the polymer thin film 220 is exposed in the vapor 510 of the first solvent 530, the first solvent 530 diffuses into the polymer thin film 220 such that the polymer thin film 220 is swollen, and the swollen polymer thin film 230 including the polymer 211 and the first solvent 530 is formed. A homogeneous spatial distribution of the first solvent 530 and the polymer 211 occurs initially; subsequently, the phase separation between the first solvent 530 and the polymer 211 begins. Finally, the developed morphologies are kinetically trapped by freezing in the liquid nitrogen 540. The first solvent 530 is crystalized in low temperature, and the nanoporous polymer thin film 240 including the plurality of pores 212 can be formed by removing the first solvent 530 with the second solvent.

Figure 4:
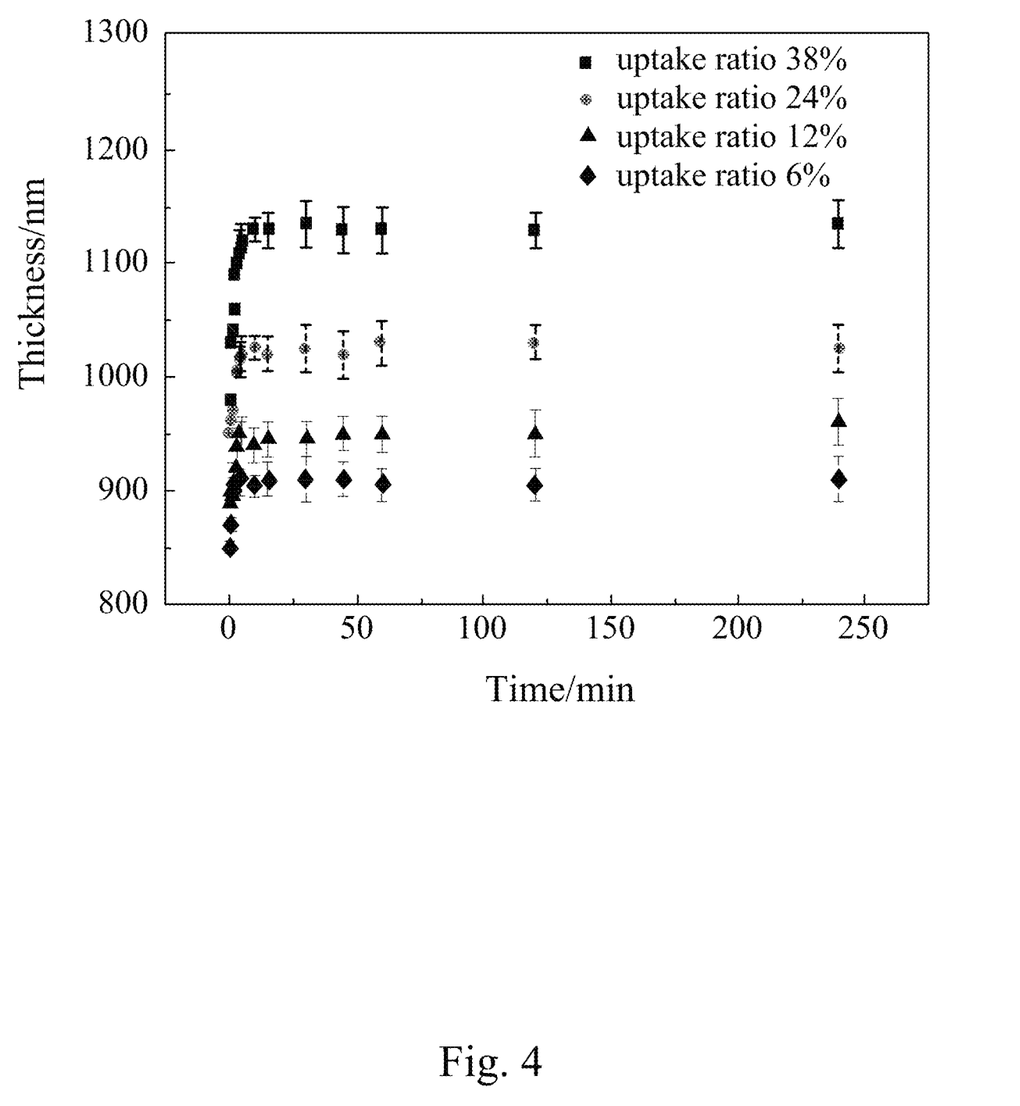
FIG. 4 shows a relationship between different uptake ratios of the first solvent and the thickness of the polymer thin film.

FIG. 4 shows a relationship between different uptake ratios of the first solvent 530 and the thickness of the polymer thin film 220. Refer to FIG. 4, a density of the pores 212 of the nanoporous polymer thin film 240 can be adjusted by the swelling and annealing process in Step 120. Precisely, in the swelling and annealing process, a gas 520 is used for adjusting a mole fraction of the vapor 510 of the first solvent 530 in the chamber 400 to change a weight percentage of the first solvent 530 in the swollen polymer thin film 230. Therefore, the uptake ratio of the first solvent 530 absorbed by the polymer thin film 220, which is also the weight percentage of the first solvent 530 in the swollen polymer thin film 230, is changed according to the mole fraction of the vapor 510 in the chamber 400 adjusted by the gas 520. As shown in FIG. 4, the thickness of the polymer thin film 220 after swelling is changed, and the density (porosity) of the pores 212 of the nanoporous thin film 240 is changed accordingly.

In one example, when the mole fraction of the vapor 510 in the chamber 400 is changed to give the weight percentage of the first solvent 530 in the swollen polymer thin film 230 being 38% (under a condition that a processing time of the swelling and annealing process being 5 minutes), an average porosity of the nanoporous polymer thin film 240 is 40%. In another example, when the mole fraction of the vapor 510 in the chamber 400 is changed to give the weight percentage of the first solvent 530 in the swollen polymer thin film 230 being 24% (under a condition that a processing time of the swelling and annealing process being 5 minutes), the average porosity of the nanoporous polymer thin film 240 is 30%. It is clear that the porosity of the nanoporous polymer thin film 240 is increased as the uptake ratio of the first solvent 530 absorbed by the polymer thin film 220 is increase. Preferably, the weight percentage of the first solvent 530 in the swollen polymer thin film 230 is equal to or greater than 6%. The gas can be nitrogen or other gas which does not react with the polymer 211.

Additionally, the size of the pore 212 (pore size) can be controlled by controlling the processing time of the swelling and annealing process. The size of the pore 212 is smaller as the processing time of the polymer thin film 220 in the vapor 510 is shorter. On the other hand, the pore size is larger as the processing time of the polymer thin film 220 in the vapor 510 is longer. Preferably, the processing time of the swelling and annealing process is in a range of 5 minutes to 240 minutes; particularly, the processing time of the swelling and annealing process is in a range of 5 minutes to 60 minutes.

Please be noted that the observed morphological development (phase separation) is a typical behavior of the spinodal decomposition kinetics. Spinodal decomposition in polymer blends or solutions is a spontaneous phase separation process that occurs when an infinitesimally small fluctuation in the system from homogeneity provokes an exponential growth of the starting fluctuations because of a lowering in the free energy of the system resulting from the phase separation process.

The polymer thin film is metastable under saturated swelling condition because of the first solvent initially, and then undergoes a rapid phase separation when there is an infinitesimal compositional fluctuation. In addition, the annealing results in a rapid evolution of features.

Example

Figure 5A:
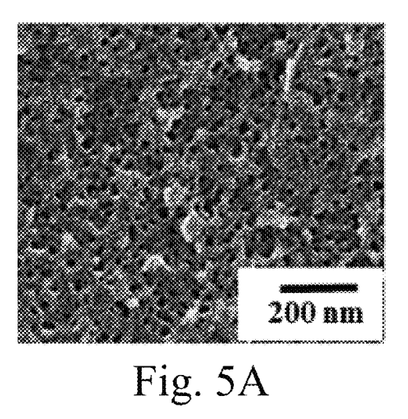
FIG. 5A shows a top view of a nanoporous polymer thin film of a 1st example of the present disclosure.
Figure 5B:
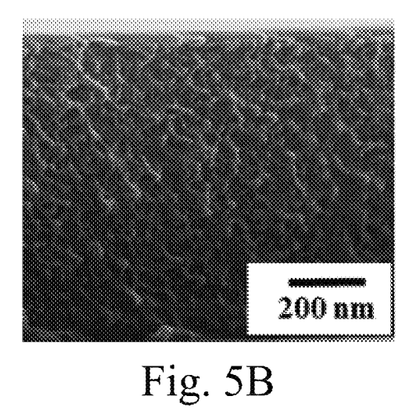
FIG. 5B shows a cross-sectional view of the nanoporous polymer thin film of the 1st example of FIG. 5A.
Figure 5C:
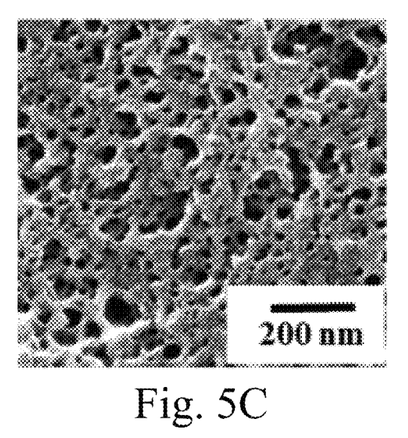
FIG. 5C shows a top view of a nanoporous polymer thin film of a 2nd example of the present disclosure.
Figure 5D:
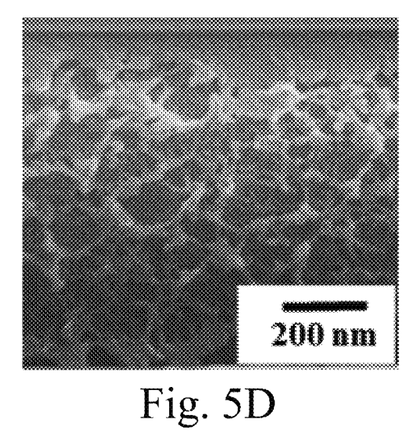
FIG. 5D shows a cross-sectional view of the nanoporous polymer thin film of the 2nd example of FIG. 5C.
Figure 5E:
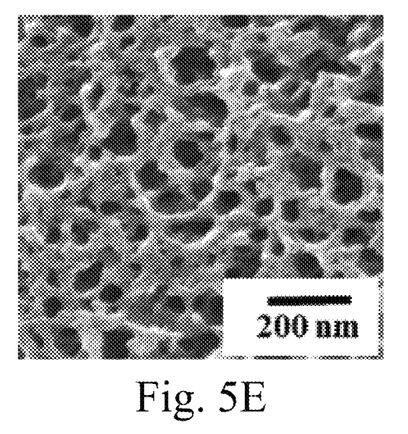
FIG. 5E shows a top view of a nanoporous polymer thin film of a 4th example of the present disclosure.
Figure 5F:
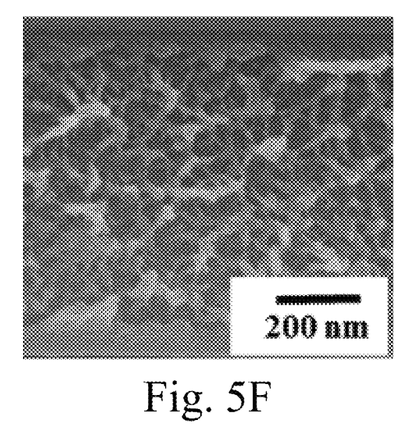
FIG. 5F shows a cross-sectional view of the nanoporous polymer thin film of the 4th example of FIG. 5E.

Please refer to FIGS. 5A, 5B, 5C, 5D, 5E and 5F. FIG. 5A shows a top view of a nanoporous polymer thin film of a 1st example of the present disclosure. FIG. 5B shows a cross-sectional view of the nanoporous polymer thin film of the 1st example of FIG. 5A. FIG. 5C shows a top view of a nanoporous polymer thin film of a 2nd example of the present disclosure. FIG. 5D shows a cross-sectional view of the nanoporous polymer thin film of the 2nd example of FIG. 5C. FIG. 5E shows a top view of a nanoporous polymer thin film of a 4th example of the present disclosure. FIG. 5F shows a cross-sectional view of the nanoporous polymer thin film of the 4th example of FIG. 5E. FIGS. 5A to 5F are SEM images.

In the 1st example to the 4th example, the polymer is polystyrene with a molecular weight of 280,000 g/mol from Scientific polymer products, Inc. The polystyrene is mixed with chlorobenzene (99% GC) from Methanol Alfa Aesar to form the polymer solution, and the weight percentage of the polystyrene is 7%. In fabrication, the polymer is spin-coated onto the substrate at 2000 rpm to form the polymer thin film, and then the polymer thin film is disposed in the vacuum oven for 1 minute.

Subsequently, the polymer thin film is kept into the chamber for the swelling and annealing process, and the chamber includes the vapor of the first solvent which is N,N-dimethylformamide (98% GC) from JT Baker. The vapor is under saturation pressure of the first solvent. The processing time of the swelling and annealing process is 5 minutes in the 1st example. The processing time of the swelling and annealing process is 30 minutes in the 2nd example. The processing time of the swelling and annealing process is 45 minutes in the 3rd example. The processing time of the swelling and annealing process is 60 minutes in the 4th example.

As shown in FIGS. 5A to 5F, the nanoporous polymer thin film with a plurality of pores can be fabricated by the method 100 of the present disclosure. Moreover, compare to the 1st example, the pore size of the 2nd example is larger owing to the longer processing time of the swelling and annealing process, and the nanoporous polymer thin film of the 4th example whose processing time of the swelling and annealing time is the longest has the largest pore size.

Figure 6:
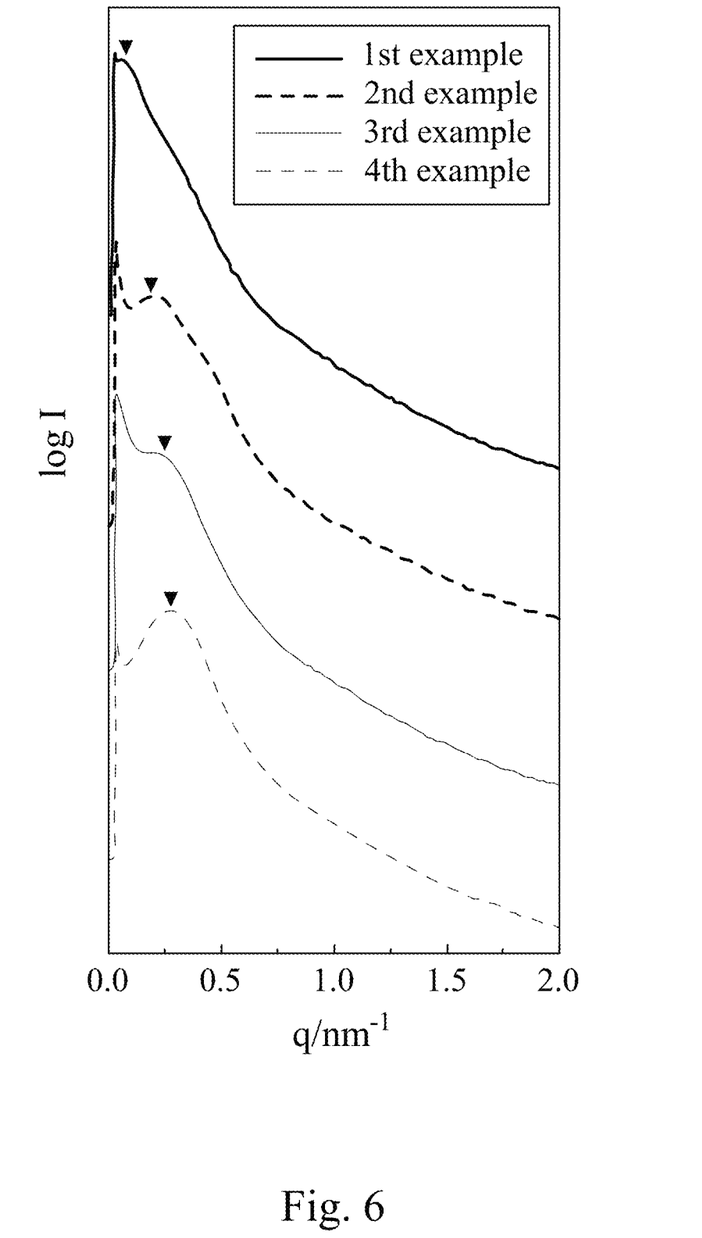
FIG. 6 shows SAXS measuring results of the 1st example, the 2nd example, a 3rd example and the 4th example.
Figure 7A:
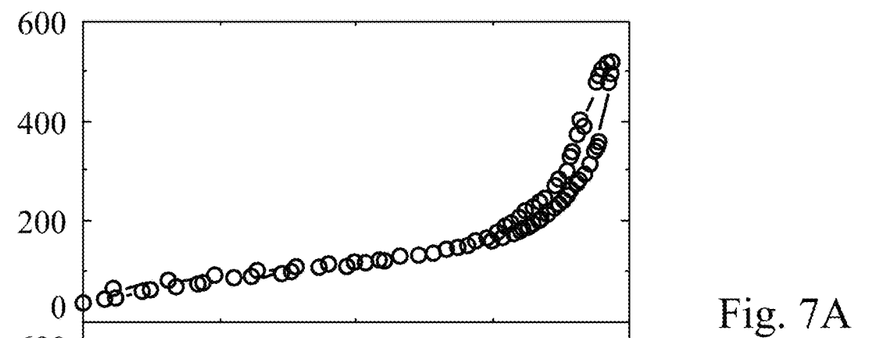
FIGS. 7A to 7D show BET measuring results of the 1st example, the 2nd example, the 3rd example and the 4th example.
Figure 7B:
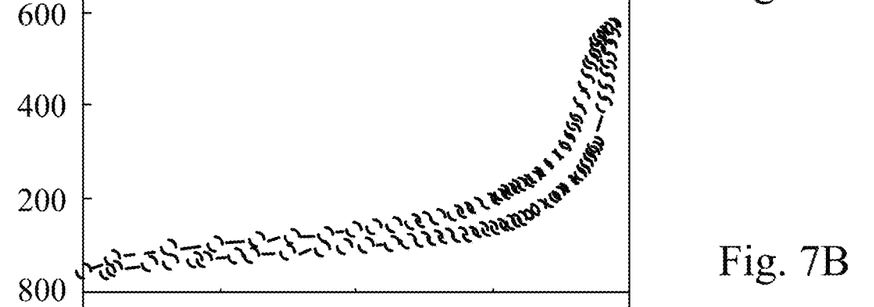
Figure 7C:
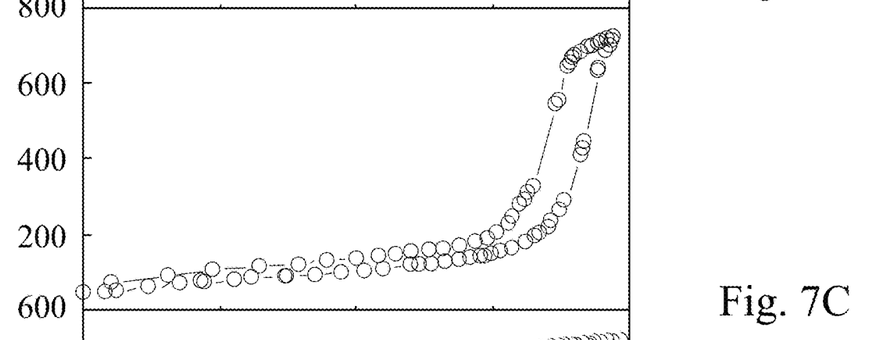
Figure 7D:
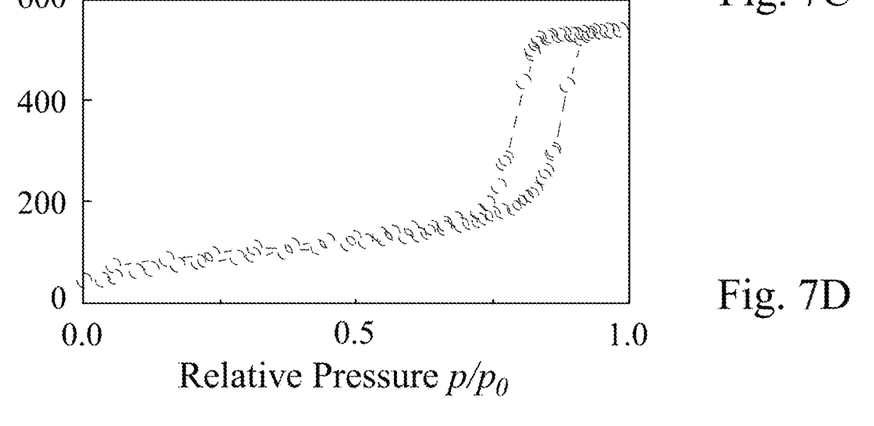

FIG. 6 shows small-angle X-ray scattering (SAXS) measuring results of the 1st example, the 2nd example, the 3rd example and the 4th example. In FIG. 6, the small-angle X-ray scattering with an X-ray wavelength of 0.1555 nm is conducted. Broad scattering peak is observed in the SAXS profile of the nanoporous polymer thin films of each of the 1st example, the 2nd example, the 3rd example and the 4th example, which is characteristic of a disordered, phase-separated state with structural heterogeneities on mesoscale. The structures obtained by the spinodal decomposition mechanism at different compositional fluctuations, i.e., at different processing time of the swelling and annealing (especially the time kept in the chamber after swelling), would diffract the light with wavenumber $q=2\pi/d$ where $d$ represents the interdomain spacing of the nanoporous polymer thin film.

FIGS. 7A to 7D show Brunauer-Emmett-Telle (BET) measuring results of the 1st example, the 2nd example, the 3rd example and the 4th example. In FIGS. 7A to 7D, $N_2$ sorption isotherm measurements at 77 K were conducted. Because the $N_2$ adsorption of the nanoporous polymer thin films will reach a maximum ($p/p_0$=0.99), it is proved that the pore development can reach the inner region of the nanoporous polymer thin film.

Figure 8:
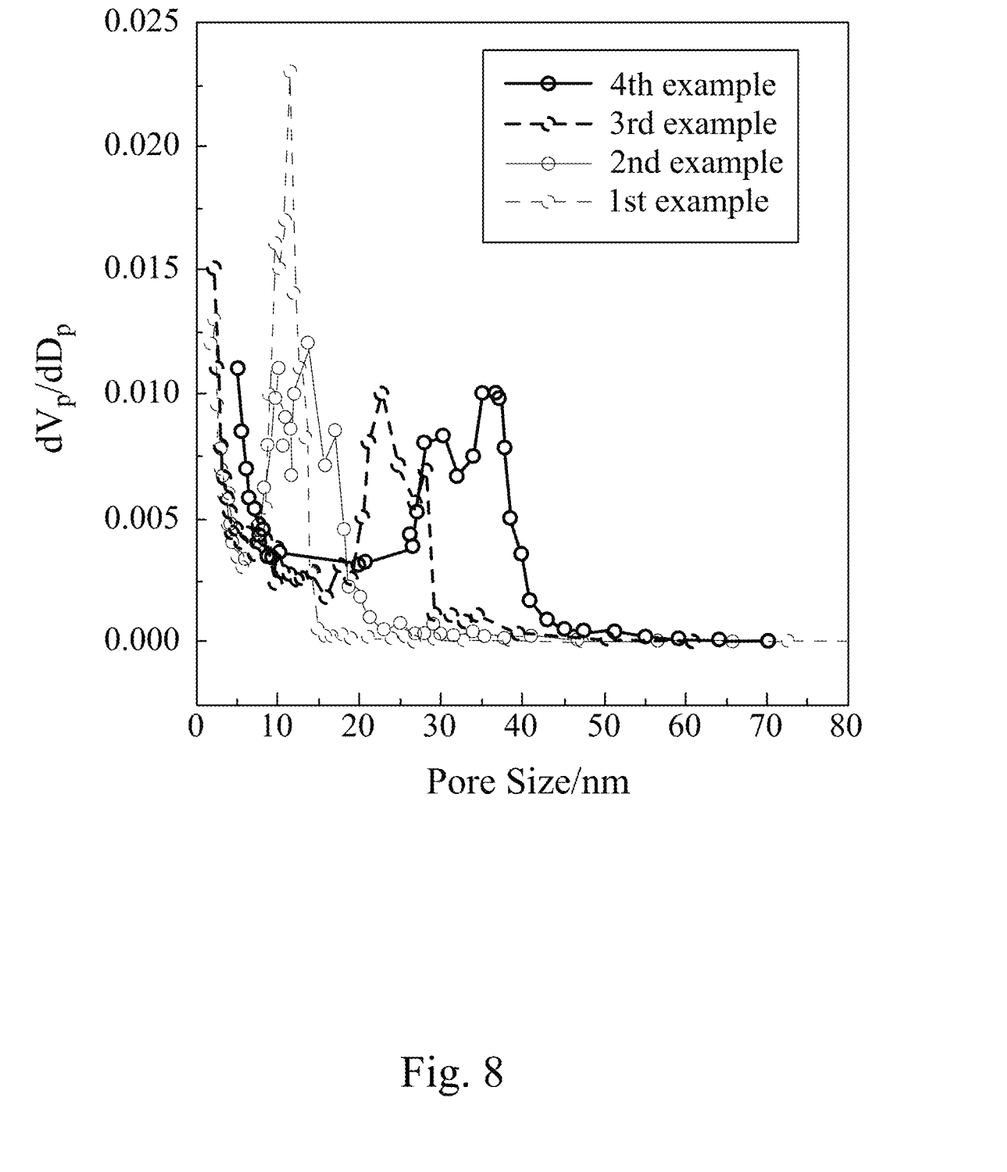
FIG. 8 shows pore size measuring results of the 1st example, the 2nd example, the 3rd example and the 4th example by BJH method.

FIG. 8 shows pore size measuring results of the 1st example, the 2nd example, the 3rd example and the 4th example by Barrett-Joyner-Halenda (BJH) method. As shown in FIG. 8, the nanoporous polymer thin films of the 1st example, the 2nd example, the 3rd example and the 4th example have different pore size. Therefore, through the control of the swelling and annealing time, not only does the nanoporous polymer thin film have high specific surface area, but also the pore size can be effectively controlled.

Table 1 shows structural parameters of the nanoporous polymer thin films of the 1st example to the 4th example. The structural parameters such as a framework size, an interdomain spacing, a pore diameter, a porosity and a BET specific surface area are shown.

TABLE 1

| | framework size (nm) | inter-domain spacing (nm) | pore diameter (nm) | porosity (%) | BET specific surface area (m²/g) |
|---|---|---|---|---|---|
| 1st example | 10 | 23 | 10 | 29 | 298 |
| 2nd example | 15 | 30 | 16 | 34 | 250 |
| 3rd example | 23 | 40 | 25 | 31 | 205 |
| 4th example | 50 | 100 | 35 | 29 | 183 |

Method for Fabricating Nanoporous Thin Film

Figure 9:
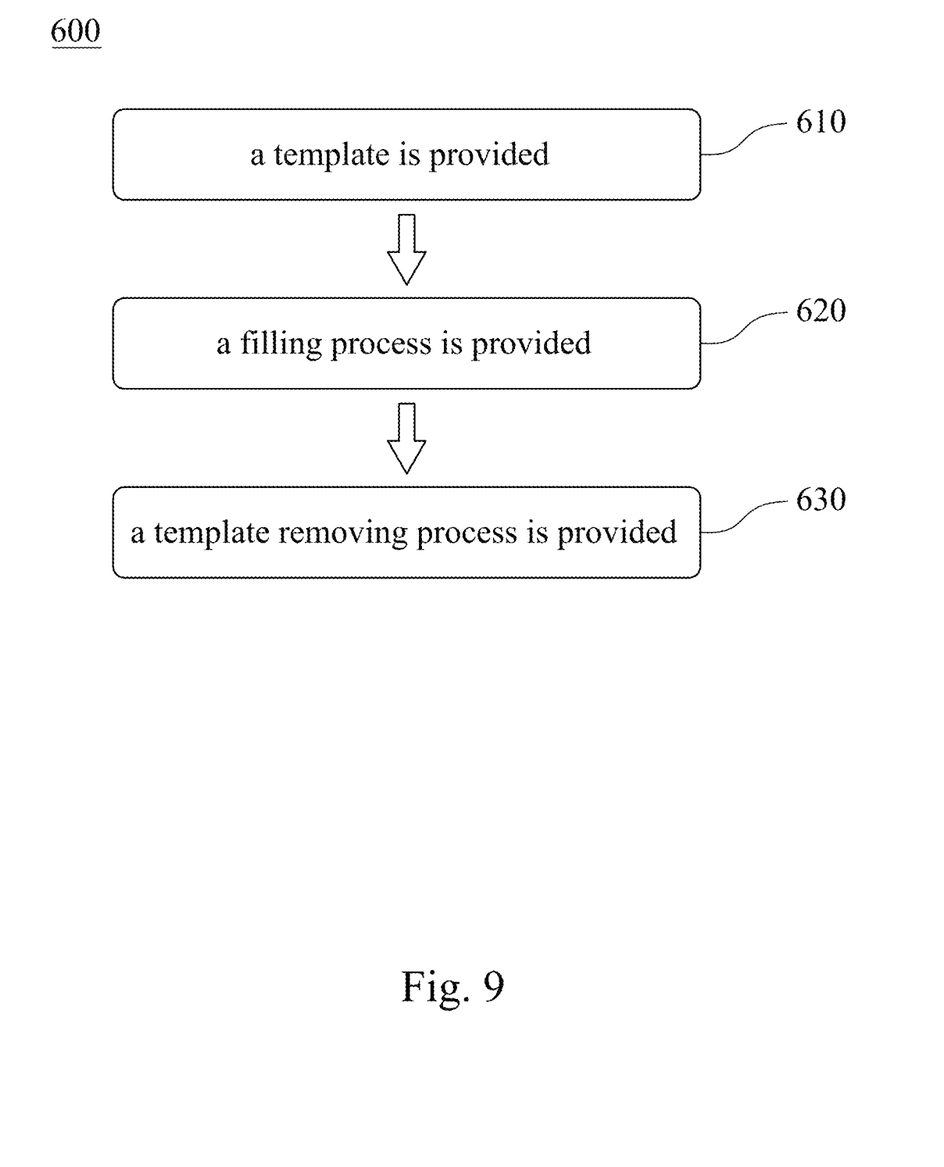
FIG. 9 shows a flow chart of a method for fabricating nanoporous thin film according to another embodiment of the present disclosure.
Figure 10:
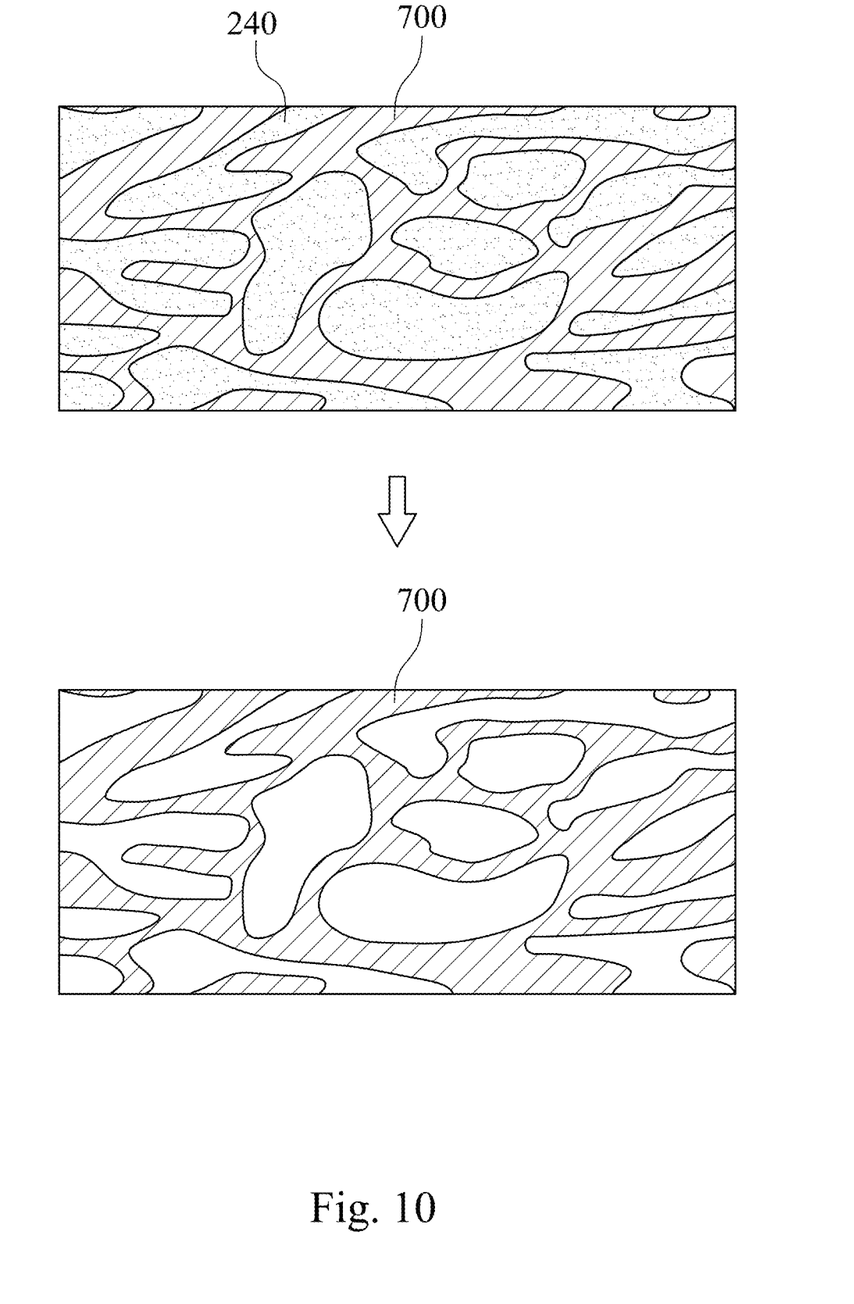
FIG. 10 shows a schematic illustration of the method of FIG. 9.

FIG. 9 shows a flow chart of a method 600 for fabricating nanoporous thin film according to another embodiment of the present disclosure. FIG. 10 shows a schematic illustration of the method 600 of FIG. 9. Refer to FIGS. 9 and 10, the method 600 includes Step 610, Step 620 and Step 630.

In Step 610, a template is provided, wherein the template includes a nanoporous polymer thin film 240 fabricated by the abovementioned method 100.

In Step 620, a filling process is provided. A mixture film is fabricated. The mixture film includes a first material 700 and the nanoporous polymer thin film 240, and the first material 700 is filled in a plurality of pores 212 of the nanoporous polymer thin film 240.

In Step 630, a template removing process is provided. The nanoporous polymer thin film 240 is removed to form a nanoporous thin film composed of the first material 700.

Therefore, the nanoporous thin film can be fabricated by the low-cost nanoporous polymer thin film 240, and the nanoporous polymer thin film 240 has large specific surface area. In one embodiment, the first material can be oxide silicon ($SiO_2$).

By executing the sol-gel reaction of $SiO_2$ precursors (e.g., tetraethyl orthosilicate) within the 3D co-continuous nano-channels, i.e., the pores 212, of the nanoporous polymer thin film 240, the mixture film including the polymer and $SiO_2$ can be fabricated. In Step 630, after calcination of the mixture film at high temperature, the nanoporous polymer thin film 240 can be removed to obtain the nanoporous $SiO_2$ thin film with high porosity and high specific surface area. In other embodiment, the first material can be oxide titanium.

In another embodiment, the first material is nickel. In Step 620, the formation of Ni from electroless plating is an autocatalytic reduction process in an aqueous Ni ion solution. Subsequently, a mixture film including the polymer and nickel with co-continuous metallic networks can be fabricated. In Step 630, the nanoporous Ni thin film can be fabricated after the removal of the template (nanoporous polymer thin film) by solvent treatment.

In other embodiment, the first material can be, but not be limited to, other metals, or a ceramic.

Figure 11A:
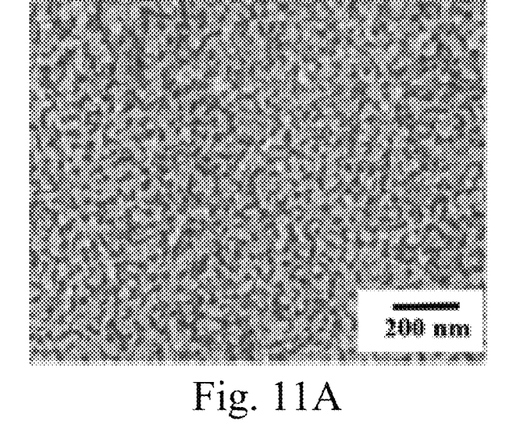
FIG. 11A shows one nanoporous thin film fabricated by the method of FIG. 9.
Figure 11B:
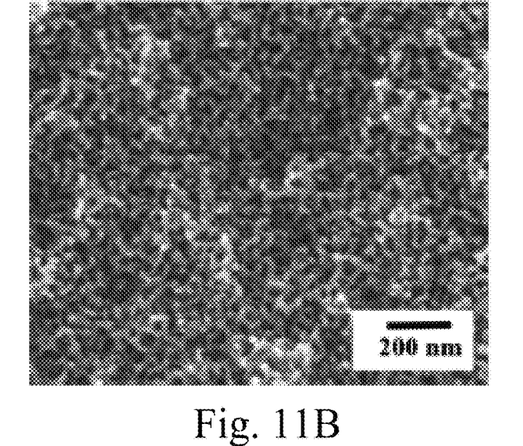
FIG. 11B shows another nanoporous thin film fabricated by the method of FIG. 9.
Figure 11C:
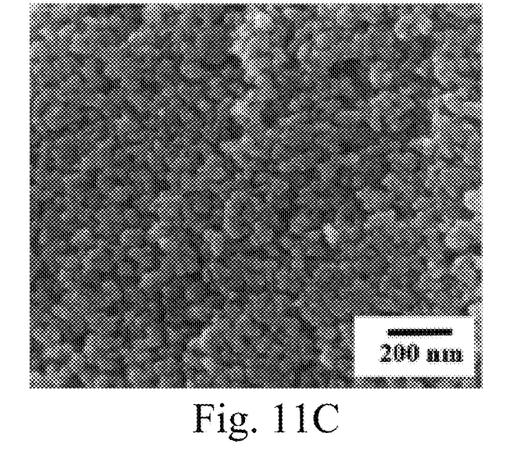
FIG. 11C shows yet another nanoporous thin film fabricated by the method of FIG. 9.

Refer to FIGS. 11A, 11B and 11C. FIG. 11A shows one nanoporous thin film fabricated by the method 600 of FIG. 9. FIG. 11B shows another nanoporous thin film fabricated by the method 600 of FIG. 9. FIG. 11C shows yet another nanoporous thin film fabricated by the method 600 of FIG. 9. FIGS. 11A to 11C are SEM images.

$SiO_2$ is severed as the first material of the method 600 in FIG. 11A such that a nanoporous $SiO_2$ thin film can be fabricated. Because the nanoporous polymer thin film of the 1st example (with porosity 29%) is served as the template, a predict porosity of the nanoporous $SiO_2$ thin film is 71%. The measured porosity of the nanoporous $SiO_2$ thin film is 63% and is closed to the predict porosity, which can prove that the nanoporous $SiO_2$ thin film fabricated by the method 600 has high porosity. The nanoporous $SiO_2$ thin film exhibits excellent anti-reflection and high transmission property; hence, its low refractive index might improve the efficiency of the opto-electronic devices by increasing the light transmission.

$TiO_2$ is severed as the first material of the method 600 in FIG. 11B such that a nanoporous $TiO_2$ thin film can be fabricated. The nanoporous $TiO_2$ thin film can be applied to the perovskite solar cell to increase effective dispersion of active perovskite materials in the solar cell. Additionally, the perovskite solar cell integrated with the nanoporous $TiO_2$ thin film is expected to increase the efficient many folds with enhanced quantum efficiency.

In FIG. 11C, nickel is severed as the other metallic materials that a nanoporous nickel thin film can be fabricated. The nanoporous nickel thin film exhibits excellent catalytic properties over the hydrogenation of aromatic and unsaturated compounds with very high selectivity and turnover frequencies.

Based on the above embodiment and examples, it can be known that the pore size and the porosity of the nanoporous polymer thin film can be adjusted precisely to obtain the nanoporous polymer thin film having a well-interconnected co-continuous network structure with pore size ranging from 10 nm to 100 nm. Particularly, the phase-separation between the polymer and the first solvent occurs in the swelling and annealing process, and the nanoporous polymer thin film having the well-interconnected co-continuous network structure can be fabricated by freezing the phase-separated swollen polymer thin film and removal of the frozen first solvent; therefore, the method is facile and cost-effective.

Furthermore, the pore size of the nanoporous thin film can be well controlled by solvent annealing kinetics. In the swelling and annealing process, the nanoporous polymer thin film is found to have wide range of pore size control resulting from the co-continuous phase formation by spinodal decomposition in nanoscale. The increase in the processing time of the swelling and annealing can increase the pore size of the nanoporous polymer thin film, and the porosity can be controlled efficiently by changing the uptake ratio of the first solvent absorbed in the swelling and annealing process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for fabricating nanoporous polymer thin film, the method comprising:
   providing a polymer thin film, wherein a polymer solution comprising a polymer is coated on a substrate to form the polymer thin film;
   providing a swelling and annealing process, wherein the polymer thin film is kept inside a chamber with a vapor of a first solvent, the polymer thin film is swollen and annealed to form a swollen polymer thin film, and the swollen polymer thin film comprises the polymer and the first solvent;
   providing a freezing process, wherein the swollen polymer thin film is cooled to a temperature less than or equal to a crystallization temperature of the first solvent to crystallize the first solvent; and
   providing a first solvent removing process, wherein the first solvent is removed with a second solvent, such that a nanoporous polymer thin film is obtained.

2. The method of claim 1, wherein the polymer is polystyrene, the first solvent is N,N-dimethylformamide, and the second solvent is methanol.

3. The method of claim 1, wherein in the swelling and annealing process, a gas is used for adjusting a mole fraction of the vapor of the first solvent in the chamber to change a weight percentage of the first solvent in the swollen polymer thin film.

4. The method of claim 3, wherein the weight percentage of the first solvent in the swollen polymer thin film is greater than or equal to 6%.

5. The method of claim 3, wherein the gas is nitrogen.

6. The method of claim 1, wherein a processing time of the swelling and annealing process is in a range of 5 minutes to 60 minutes.

7. The method of claim 1, wherein in the freezing process, liquid nitrogen is used to cool the swollen polymer thin film.

8. A method for fabricating nanoporous thin film, the method comprising:
   providing a template, wherein the template comprises a nanoporous polymer thin film fabricated by the method of claim 1;
   providing a filling process, wherein a mixture film is fabricated, the mixture film comprises a first material and the nanoporous polymer thin film, and the first material is filled in a plurality of pores of the nanoporous polymer thin film; and
   providing a template removing process, wherein the nanoporous polymer thin film is removed to form a nanoporous thin film, and the nanoporous thin film is composed of the first material.

9. The method of claim 8, wherein the first material is a metal, or a ceramic.

10. The method of claim 8, wherein the first material is $SiO_2$, $TiO_2$ or nickel.

* * * * *